United States Patent
Hauser (10) Patent No.: US 9,940,391 B2
(45) Date of Patent: Apr. 10, 2018

(54) SYSTEM, METHOD AND COMPUTER READABLE MEDIUM FOR WEB CRAWLING

(75) Inventor: Robert R Hauser, Frisco, TX (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 0 days.

(21) Appl. No.: 13/287,535

(22) Filed: Nov. 2, 2011

(65) Prior Publication Data
US 2012/0047122 A1     Feb. 23, 2012

Related U.S. Application Data

(63) Continuation of application No. 12/435,774, filed on May 5, 2009.

(51) Int. Cl.
G06F 17/30     (2006.01)

(52) U.S. Cl.
CPC ............... G06F 17/30864 (2013.01)

(58) Field of Classification Search
USPC ................................ 707/726, 723
See application file for complete search history.

(56) References Cited

U.S. PATENT DOCUMENTS

| | | | |
|---|---|---|---|
| 6,581,072 B1 | 6/2003 | Mathur et al. | |
| 6,826,567 B2 | 11/2004 | Tada et al. | |
| 6,848,108 B1 | 1/2005 | Caron | |
| 7,051,042 B2 | 5/2006 | Krishnaprasad et al. | |
| 7,877,421 B2 | 1/2011 | Berger et al. | |
| 8,327,385 B2 | 12/2012 | Hauser | |
| 8,751,628 B2 | 6/2014 | Hauser | |
| 8,832,257 B2 | 9/2014 | Hauser | |
| 9,330,395 B2 | 5/2016 | Hauser | |
| 9,336,191 B2 | 5/2016 | Hauser | |
| 9,442,621 B2 | 9/2016 | Hauser | |
| 9,507,870 B2 | 11/2016 | Hauser | |
| 2004/0006742 A1 | 1/2004 | Slocombe | |
| 2004/0260679 A1 | 12/2004 | Best et al. | |
| 2005/0108636 A1 | 5/2005 | Sylthe et al. | |
| 2005/0114316 A1 | 5/2005 | Fontoura et al. | |
| 2006/0004725 A1 | 1/2006 | Abraido-Fandino | |

(Continued)

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

(Continued)

Primary Examiner — Alex Gofman
(74) Attorney, Agent, or Firm — Kilpatrick Townsend & Stockton LLP (57) ABSTRACT

In a web crawler, a URL selection module selects URLs for pages to be downloaded. The URL selection module accesses an interaction data store that stores interaction data for web pages, including interaction data that indicates human interactions with the pages. To reduce the effects of link farms, the URL selection module filters the URLs to select only those URLs that have human interaction histories and provides the selected URLs to a download module for web page downloading.

20 Claims, 9 Drawing Sheets

(56) References Cited

U.S. PATENT DOCUMENTS

| | | | |
|---|---|---|---|
| 2006/0026147 | A1 | 2/2006 | Cone et al. |
| 2006/0136589 | A1 | 6/2006 | Konig et al. |
| 2006/0161532 | A1 | 7/2006 | Wen et al. |
| 2006/0248057 | A1 | 11/2006 | Jacobs et al. |
| 2007/0016553 | A1 | 1/2007 | Dumais et al. |
| 2007/0050338 | A1 | 3/2007 | Strohm et al. |
| 2007/0239701 | A1* | 10/2007 | Blackman ......... G06F 17/30864 |
| 2008/0016087 | A1 | 1/2008 | Zhang et al. |
| 2008/0046218 | A1 | 2/2008 | Dontcheva et al. |
| 2008/0228910 | A1 | 9/2008 | Petri |
| 2008/0270375 | A1* | 10/2008 | Nanduri et al. ................... 707/5 |
| 2009/0063500 | A1 | 3/2009 | Zhai et al. |
| 2009/0164447 | A1 | 6/2009 | Daya et al. |
| 2009/0276399 | A1* | 11/2009 | Irmak et al. ...................... 707/3 |
| 2009/0287645 | A1* | 11/2009 | Dasdan et al. .................... 707/3 |
| 2010/0049760 | A1 | 2/2010 | Rousseau et al. |
| 2010/0100543 | A1 | 4/2010 | Brady et al. |
| 2010/0100551 | A1 | 4/2010 | Knauft et al. |
| 2010/0114706 | A1 | 5/2010 | Kosuru et al. |
| 2010/0153836 | A1 | 6/2010 | Krassner et al. |
| 2010/0287134 | A1 | 11/2010 | Hauser |
| 2010/0287152 | A1 | 11/2010 | Hauser |
| 2010/0287462 | A1 | 11/2010 | Hauser |
| 2012/0047431 | A1 | 2/2012 | Hauser |
| 2012/0191691 | A1 | 7/2012 | Hansen |

OTHER PUBLICATIONS

U.S. Appl. No. 12/435,777, Advisory Action dated Mar. 3, 2015, 2 pages.
U.S. Appl. No. 12/435,777, Applicant Initiated Interview Summary dated Sep. 5, 2017, 3 pages.
U.S. Appl. No. 12/435,777, Final Office Action dated Dec. 19, 2014, 15 pages.
U.S. Appl. No. 12/435,777, Final Office Action dated Jan. 20, 2012, 21 pages.
U.S. Appl. No. 12/435,777, Final Office Action dated Mar. 24, 2016, 22 pages.
U.S. Appl. No. 12/435,777, Final Office Action dated May 24, 2017, 25 pages.
U.S. Appl. No. 12/435,777, Non-Final Office Action dated Nov. 15, 2013, 14 pages.
U.S. Appl. No. 12/435,777, Non-Final Office Action dated Jun. 10, 2014, 15 pages.
U.S. Appl. No. 12/435,777, Non-Final Office Action dated Jun. 17, 2013, 15 pages.
U.S. Appl. No. 12/435,777, Non-Final Office Action dated Aug. 15, 2011, 18 pages.
U.S. Appl. No. 12/435,777, Non-Final Office Action dated Dec. 19, 2016, 22 pages.
U.S. Appl. No. 12/435,777, Non-Final Office Action dated Sep. 2, 2015, 23 pages.
U.S. Appl. No. 13/287,568, Advisory Action dated Jun. 3, 2014, 3 pages.
U.S. Appl. No. 13/287,568, Applicant Initiated Interview Summary dated Sep. 5, 2017, 3 pages.
U.S. Appl. No. 13/287,568, Final Office Action dated Jul. 7, 2017, 18 pages.
U.S. Appl. No. 13/287,568, Final Office Action dated Aug. 6, 2015, 19 pages.
U.S. Appl. No. 13/287,568, Final Office Action dated Mar. 13, 2014, 19 pages.
U.S. Appl. No. 13/287,568, Final Office Action dated Apr. 27, 2012, 25 pages.
U.S. Appl. No. 13/287,568, Final Office Action dated Nov. 10, 2016, 7 pages.
U.S. Appl. No. 13/287,568, Non-Final Office Action dated Feb. 20, 2015, 18 pages.
U.S. Appl. No. 13/287,568, Non-Final Office Action dated Oct. 1, 2013, 18 pages.
U.S. Appl. No. 13/287,568, Non-Final Office Action dated Jan. 3, 2012, 20 pages.
U.S. Appl. No. 13/287,568, Non-Final Office Action dated Apr. 29, 2016, 23 pages.
U.S. Appl. No. 13/287,568, Non-Final Office Action dated Feb. 1, 2017, 25 pages.
U.S. Appl. No. 12/435,774, Advisory Action dated Apr. 9, 2014, 3 pages.
U.S. Appl. No. 12/435,774, Advisory Action dated Dec. 21, 2016, 3 pages.
U.S. Appl. No. 12/435,774, Advisory Action dated Mar. 3, 2016, 3 pages.
U.S. Appl. No. 12/435,774, Advisory Action dated Nov. 7, 2012, 3 pages.
U.S. Appl. No. 12/435,774, Final Office Action dated Nov. 9, 2011, 12 pages.
U.S. Appl. No. 12/435,774, Final Office Action dated Dec. 23, 2015, 14 pages.
U.S. Appl. No. 12/435,774, Final Office Action dated Jan. 23, 2015, 14 pages.
U.S. Appl. No. 12/435,774, Final Office Action dated Oct. 12, 2016, 14 pages.
U.S. Appl. No. 12/435,774, Final Office Action dated Aug. 30, 2012, 15 pages.
U.S. Appl. No. 12/435,774, Final Office Action dated Jan. 27, 2014, 16 pages.
U.S. Appl. No. 12/435,774, Non-Final Office Action dated May 13, 2011, 13 pages.
U.S. Appl. No. 12/435,774, Non-Final Office Action dated Aug. 19, 2015, 15 pages.
U.S. Appl. No. 12/435,774, Non-Final Office Action dated May 10, 2012, 15 pages.
U.S. Appl. No. 12/435,774, Non-Final Office Action dated Sep. 8, 2014, 15 pages.
U.S. Appl. No. 12/435,774, Non-Final Office Action dated Jul. 30, 2013, 16 pages.
U.S. Appl. No. 12/435,774, Non-Final Office Action dated Jun. 13, 2016, 17 pages.
U.S. Appl. No. 13/287,568, Non-Final Office Action dated Feb. 12, 2018, 28 pages.

* cited by examiner

SYSTEM, METHOD AND COMPUTER READABLE MEDIUM FOR WEB CRAWLING

CROSS-REFERENCE TO RELATED APPLICATIONS

This application is a continuation of and claims priority from U.S. patent application Ser. No. 12/435,774 filed on May 5, 2009, entitled SYSTEM, METHOD AND COMPUTER READABLE MEDIUM FOR WEB CRAWLING; this application is incorporated herein by reference in its' entirety.

FIELD OF THE INVENTION

This invention relates to a system, method and computer medium for crawling the web to find relevant internet content.

BACKGROUND OF THE INVENTION

In internet technology, web crawlers are used to find new web pages by collecting and following URLs (Uniform Resource Locators). By following an URL and downloading the corresponding web page the links within that web page can be added to the web crawler's URL collection. The web pages are stored for indexing and ranking by internet search engines. Internet search engines use web page ranking algorithms that relate the links within a web page to the relevance of the web page.

The use of link popularity algorithms to rank web pages has lead to the problem of "link farms". In order to manipulate a web page's ranking, a large sub-web of interlinked web pages is created and linked to a web page so that the page receives a high search engine ranking. In addition to distortion of web page rankings, a problem with link farms is that a web crawler spends a lot of resources following links and collecting web pages for eventual indexing into a search engine, even though many of these pages are created only for page ranking and are not otherwise used by, nor useful for humans.

What is required is a system, method and computer readable medium that provides enhanced web crawling.

SUMMARY OF THE INVENTION

In one aspect of the disclosure, there is provided a method for web crawling comprising determining a plurality of Uniform Resource Locators (URL)s, determining a subset of the plurality of URLs that have associated interaction data, selecting at least one URL of the subset, and downloading a web page corresponding to the at least one selected URL.

In one aspect of the disclosure, there is provided a web crawler comprising at least one Uniform Resource Locator (URL) data store that stores a plurality of URLs, at least one interaction data store that stores interaction data for a plurality of web pages, at least one download module that downloads web page content corresponding to a URL, and at least one URL selection module in communication with the at least one URL data store and the at least one interaction data store. The interaction data indicates an interaction between a human and a web page corresponding to a URL. The at least one URL selection module selects at least one URL from the at least one URL data store that has interaction data in the at least one interaction data store. The at least one URL selection module provides the at least one selected URL to the at least one download module.

In one aspect of the disclosure, there is provided a computer-readable medium comprising computer-executable instructions for execution by a processor, that, when executed, cause the processor to select a Uniform Resource Locator (URL) from a URL data store, look up the selected URL in an interaction data store to determine if interaction data exists for the selected URL in the interaction data store, and if interaction data exists for the selected URL, provide the selected URL to a download module.

BRIEF DESCRIPTION OF THE DRAWINGS

Reference will now be made, by way of example only, to specific embodiments and to the accompanying drawings in which.

DETAILED DESCRIPTION OF THE EMBODIMENTS

Figure 1:
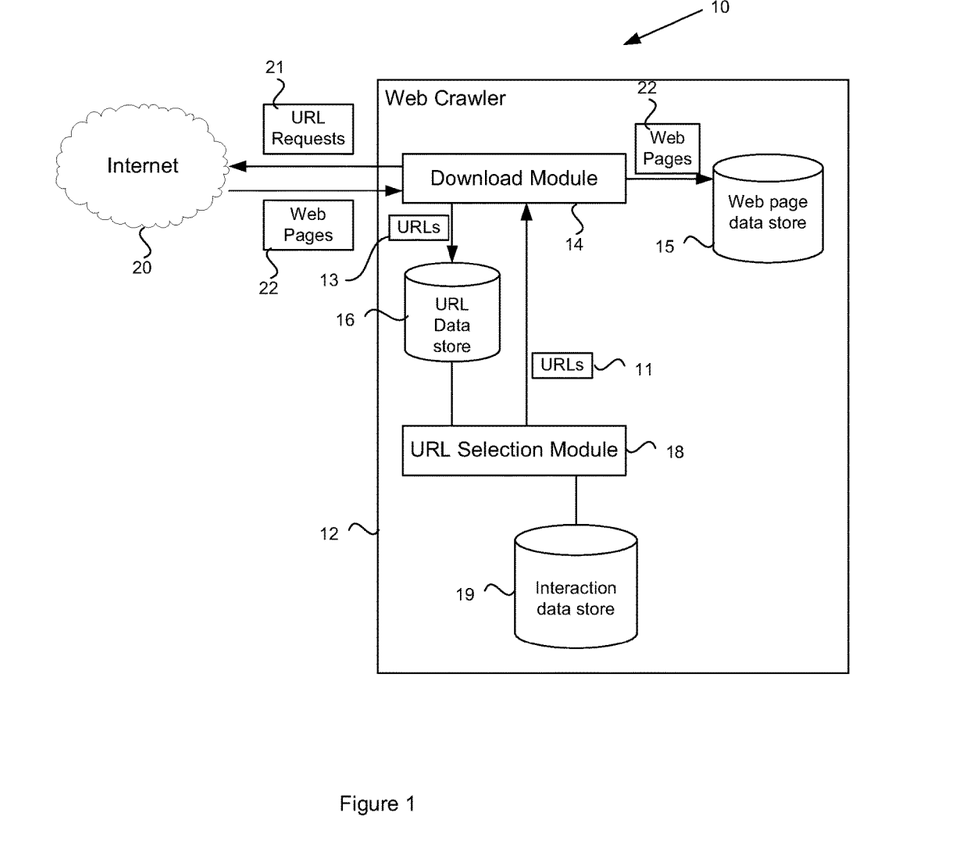
FIG. 1 illustrates a web crawler in accordance with an embodiment of the disclosure.

A system 10 for providing web crawling in accordance with an embodiment of the disclosure is illustrated in FIG. 1. In the system 10, a web crawler 12 provides URL requests 21 to the internet 20 and downloads web pages 22 corresponding to the URL requests. The web crawler 12 includes a download module 14 that downloads the web pages 22 and provides the web pages 22 to a web page data store 15. The web crawler 12 also includes a URL data store 16, a URL selection module 18 and an interaction data store 19. While the components of the web crawler are shown within the web crawler 12, a person skilled in the art will readily understand that these components may be provided in a distributed form. For example, the various data stores may be co-located with processing modules such as the download module 14 or URL selection module 18. Alternatively, the various data stores may be located offsite with data retrieval occurring through appropriate communication links.

Figure 2:
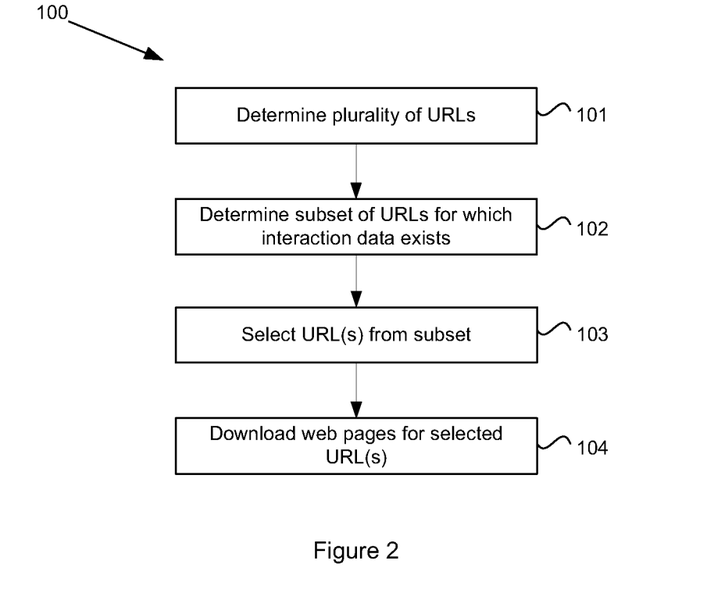
FIG. 2 illustrates a method for web crawling.

A web crawling method using the system 10 of FIG. 1 is illustrated in the flowchart 100 of FIG. 2. At step 101, the URL selection module 18 determines from the URL data store 16 a plurality of URLs for which web page content is to be downloaded. The URLs may represent new web pages or web pages for which web page content, ranking statistics etc have not been updated for a period of time. At step 102, the URL selection module 18 accesses the interaction data store 19 to determine which URLs have interaction data associated with them. URLs for which interaction data exist are formed into a subset. At least one URL is selected from the subset (step 103) and provided to the download module 14 so that the web page corresponding to the URL can be downloaded (step 104).

Figure 3:
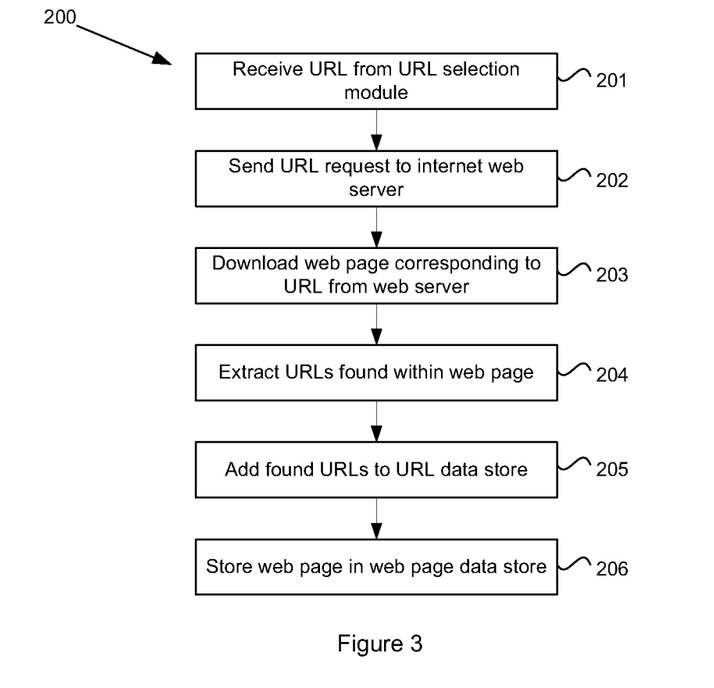
FIG. 3 illustrates a method for downloading web pages in the web crawler of FIG. 1.

The download module 14 downloads web pages 22 from the internet 20 and extracts linked URLs 13 from the download pages. The operation of the download module in accordance with an embodiment of the disclosure is illustrated in the flowchart 200 of FIG. 3. The download module receives a URL 11 to fetch from the URL selection module 18 at step 201. The download module 14 sends a URL request 21 to an appropriate web server within the internet 20 (step 202) and downloads the web page 22 corresponding to the URL request 21 from the internet 20 (step 203). At step 204, the download module 14 extracts any URLs 13 found within the web page 22. These URLs are added to the URL data store 16 (step 205). As is known, duplicate URLs are not stored multiple times and links extracted from web pages may need to be normalized into their respective URLs. The web page 22 is also loaded into the web page data store 15 (step 206).

Figure 4:
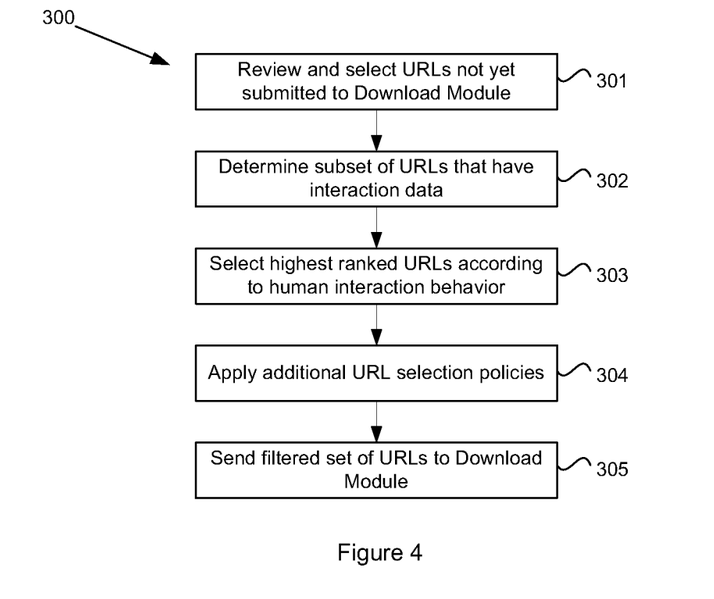
FIG. 4 illustrates a method of a URL selection module.

The operation of the URL selection module 18 in accordance with an embodiment of the disclosure is shown in the flowchart 300 of FIG. 4. At step 301, the URL selection module 18 reviews the URL data store 16 for URLs that have not yet been submitted to the download module 14. At step 302, the URL selection module 18 accesses the interaction data store 19 to determine the subset of the selected URLs that have interaction data records. The URL selection module then selects the highest ranked URLs according to human interaction behavior (step 303). In general, there are at least two types of human interaction behaviour that may be considered. There is a first type of human interaction in selecting a link (URL) that corresponds to a web page, even though the selected linked URL/web page may not have been downloaded and may not have any interaction data. This "human interaction" uses the analysis of the source element ranking and attention shift that happens in the various web pages that link to the URL/web-page-of-interest. Another case of "human interaction" utilizes the content of interest ranking within the URL/web-page-of-interest. This helps rank the importance of this URL in the link-graph. That is, how much, if any, content on the web-page/URL gets human attention time (independent of any links within the page). In ranking the URLs, a specific human behavior is an out-click of the URL on web pages that have the URL as a link. One ranking measure for human out-clicks may be the ratio of human out-clicks to total interaction exits per web page that display the URL as a link. Another ranking could rely on the attention ranking of the content area containing the URL/link (the location of the URL/link within human attentive areas of the web pages containing the URL as a link). Within the web page corresponding to a URL, the most preferred URLs have corresponding web pages that have highly ranked content areas, ranked by the amount of human attention, e.g time, that those content areas receive. Other ranking and selection policies may be applied to filter the URLs at step 304 and a filtered set of the URLs is sent to the download module at step 305, returning the cycle to step 201 of FIG. 3.

Figure 5:
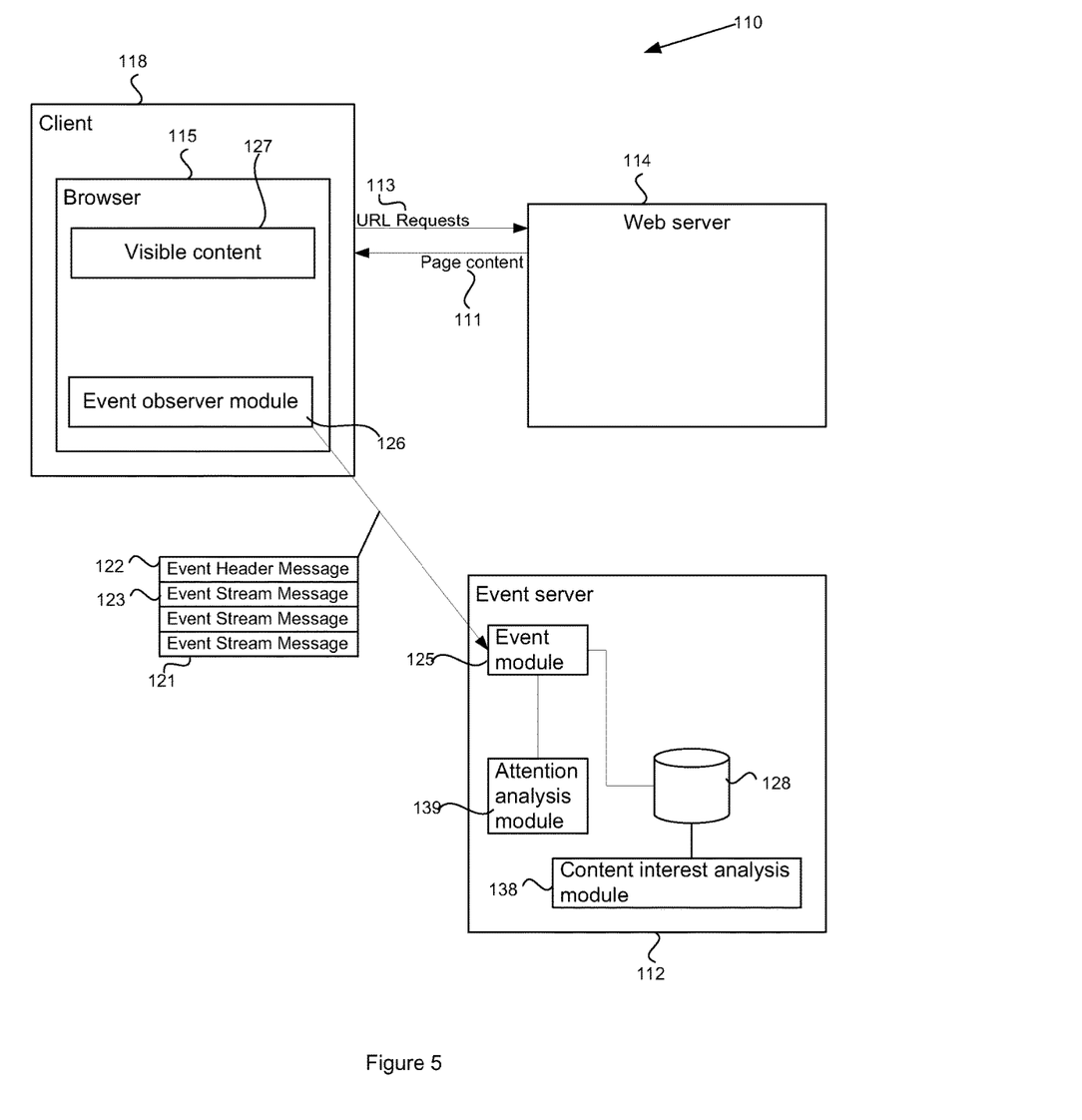
FIG. 5 illustrates a system for recording and analyzing event data.

The interaction data in the interaction data store 19 may be derived from interactions between users and the web page at client browsers, for example as described in any of the Applicant's co-pending U.S. patent application Ser. No. 12/435,740, U.S. patent application Ser. No. 12/435,748, U.S. patent application Ser. No. 12/435,751, U.S. patent application Ser. No. 12/435,754, U.S. patent application Ser. No. 12/435,758, Ser. No. 12/435,761, U.S. patent application Ser. No. 12/435,767, U.S. patent application Ser. No. 12/435,770, the entire contents of each of which are explicitly incorporated herein by reference. In particular, event recorders provided within the web pages may record event data during these interactions and provide event streams to an event server. An example of an event data processing system is illustrated in FIG. 5. In the system 110, a client 118 provides web page requests 113 to a web server 114, in response to which, the web server 114 provides page content 111 for display in a browser 115 of the client 118. Typically, the web page 111 will include visible content 127 as well as javascript applications.

The web server 114 may be modified such that the web page content provided to the client 118 includes an event observer module 126 which may be provided as appropriate code or scripts that run in the background of the client's browser 115. In one embodiment, code for providing the event observer module 126 is provided to the web server 114 by a third party service, such as provided from an event server 112, described in greater detail below.

The event observer module 126 observes events generated in a user interaction with the web page 111 at the client 118. The event observer module 126 records events generated within the web browser 115, such as mouse clicks, mouse moves, text entries etc., and generates event streams 121 including an event header message 122 and one or more event stream messages 123. It will be apparent to a person skilled in the art that terms used to describe mouse movements are to be considered broadly and to encompass all such cursor manipulation devices and will include a plug-in mouse, on board mouse, touch pad, pixel pen, eye-tracker, etc.

Figure 6:
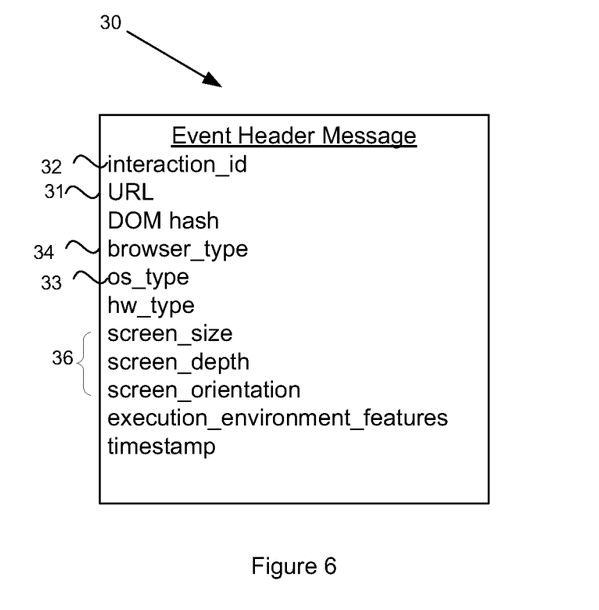
FIG. 6 illustrates an event header message.
Figure 7:
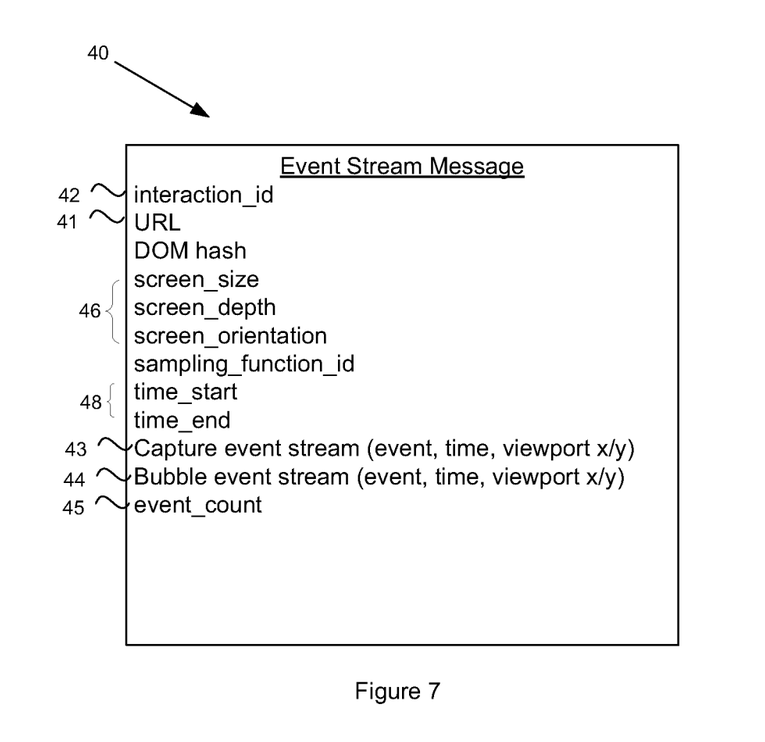
FIG. 7 illustrates an event stream message.

The event observer module 126 provides the event streams 121 to the event server 112. An example of an event header message 30 is illustrated in FIG. 6 and an example of an event stream message 40 is illustrated in FIG. 7. The messages 30, 40 show a number of components that can be included, though in various embodiments, not all of these components may be required and additional components may be added. Primarily, an Interaction_ID 32, 42 uniquely identifies an interaction between the client 18 and the web server 14 and aids to identify the particular event stream 121. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. Not all web browser types support event capture, and thus the capture event stream 43 may be empty. Where required, events missing from the event bubble stream may be inferred, for example as described in the Applicant's co-pending U.S. patent application Ser. No. 12/435,748 referenced above. An event_count field 45 may indicate the total number of unique events observed by the event observer module including those events not included in the event stream message 40 due to a current sampling function excluding them. Timing parameters 48 may indicate the relevant period over which the event stream message 40 is current.

During an interaction with the web page 111, a user navigates the web page 111 and may enter content where appropriate, such as in the HTML form elements. During this interaction events are generated and recorded by the event observer module 126. Periodically, the event observer module 126 formulates an event stream message 123 preceded by an event header message 122 if one has not yet been sent. The event observer module 126 passes the event stream messages 123 to an event module 125 of the event server 112. In the embodiment illustrated in FIG. 5, the event stream 121 is provided directly to the event module 125. However, the event stream 121 may also be provided indirectly, e.g. via the web server 114.

The event server 112 processes the event stream 121 in the event module 125 or an equivalent component, to analyze the event stream data. Analyzed data may be stored with the raw event stream messages in a content data store 128. Additional modules of the event server may include an attention analysis module 139 as described in the Applicant's co-pending application Ser. No. 12/435,761 reference above, and a content interest processing module 138 as described in the Applicant's co-pending U.S. patent application Ser. No. 12/435,767 referenced above. In one embodiment, the event stream data can be analyzed to determine the probability that the interaction that created the event stream at the client is a human dependent interaction, for example as described in the Applicant's co-pending U.S. patent application Ser. No. 12/435,740 referenced above. In the present embodiment, the existence of any human interaction within the content areas of the web page, such as hints, lingers or clicks within the content areas, may be used to indicate the validity of a URL, and such statistics may be loaded into the interaction data store 19. In one embodiment, the web crawler 12 may include the event server 112 such that the web crawler is self contained. In an alternative embodiment, human interaction data may be provided to the interaction data store as a third party service by an event server operator. Alternatively, the event server 112 may maintain its own interaction data store and provide access to the interaction data store as a service.

The interaction data store 19 may store raw event streams with processing of the event streams being performed by the URL selection module 18, for example to rank the URLs according. Alternatively, the interaction data store may have an associated processing module (not shown) that preprocesses the interaction data so that the interaction data store stores the URLs in a ranked form. For example, a processing module may process the event streams to determine an event generator type (e.g. human, non-human, computer assisted human, etc) as described in the Applicant's co-pending U.S. patent application Ser. No. 12/435,740 and U.S. patent application Ser. No. 12/435,751 referenced above. Once an interaction with a webpage has been classified as a human interaction, the data may be further processed to rank the particular behavior of the interactions. For example, the event streams may be processed to select those events streams containing out-click events, i.e. events that a user produces to exit a web page. The event streams and/or the page content may also be analyzed to determine additional preferred behavior, such as a breadth-first traversal of the web site, backlink count, partial page-rank calculations, page-rank calculations using a link graph with URLs only if those URLs have sufficient human interaction, etc. In one embodiment, the interaction pattern for parked pages, link farms, auto generated "spam" pages (that use random snippets from a variety of authentic web pages just to get high search engine ranking based on the keywords in the snippets) may be identified and used to remove these URLs from the crawl graph (not pursue the links) and/or remove such URLs from page-rank calculations.

A summary of the event statistics including any data used to rank the web pages may be stored in the interaction data store 19.

Figure 8:
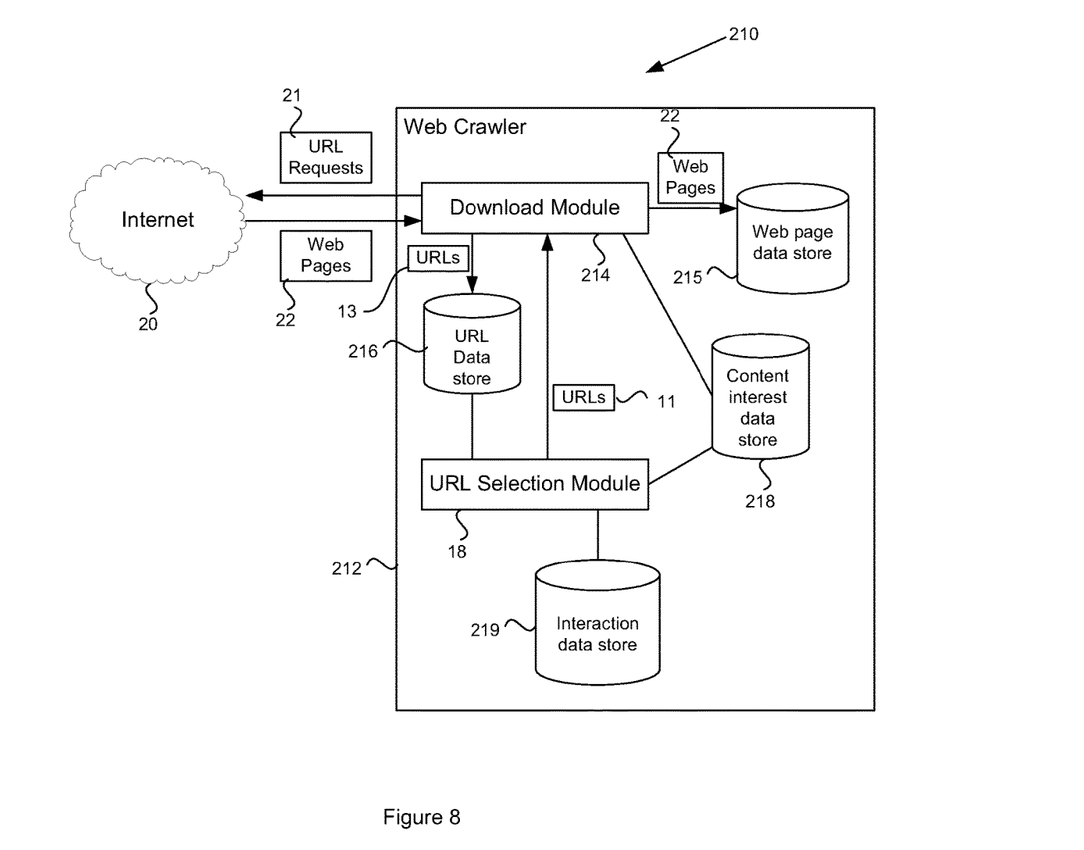
FIG. 8 illustrates an alternative web crawler embodiment.

An alternative embodiment is illustrated in FIG. 8. In this embodiment, the web crawler 212 is modified to include a content interest data store 218, which may be the same as the content interest data store described in the Applicant's co-pending U.S. patent application Ser. No. 12/435,767 referenced above. The content interest data store 218 may store content interest data including a content interest score that ranks the various elements of a web page by the interest they receive during interactions between users and the respective web page. In one particular embodiment, the elements are document object model (DOM) elements of the web page. Content interest may be derived from an attention analysis of the event streams to determine where a user's attention focus was directed during an interaction, as described in the Applicant's co-pending application Ser. No. 12/435,761 referenced above.

Figure 9:
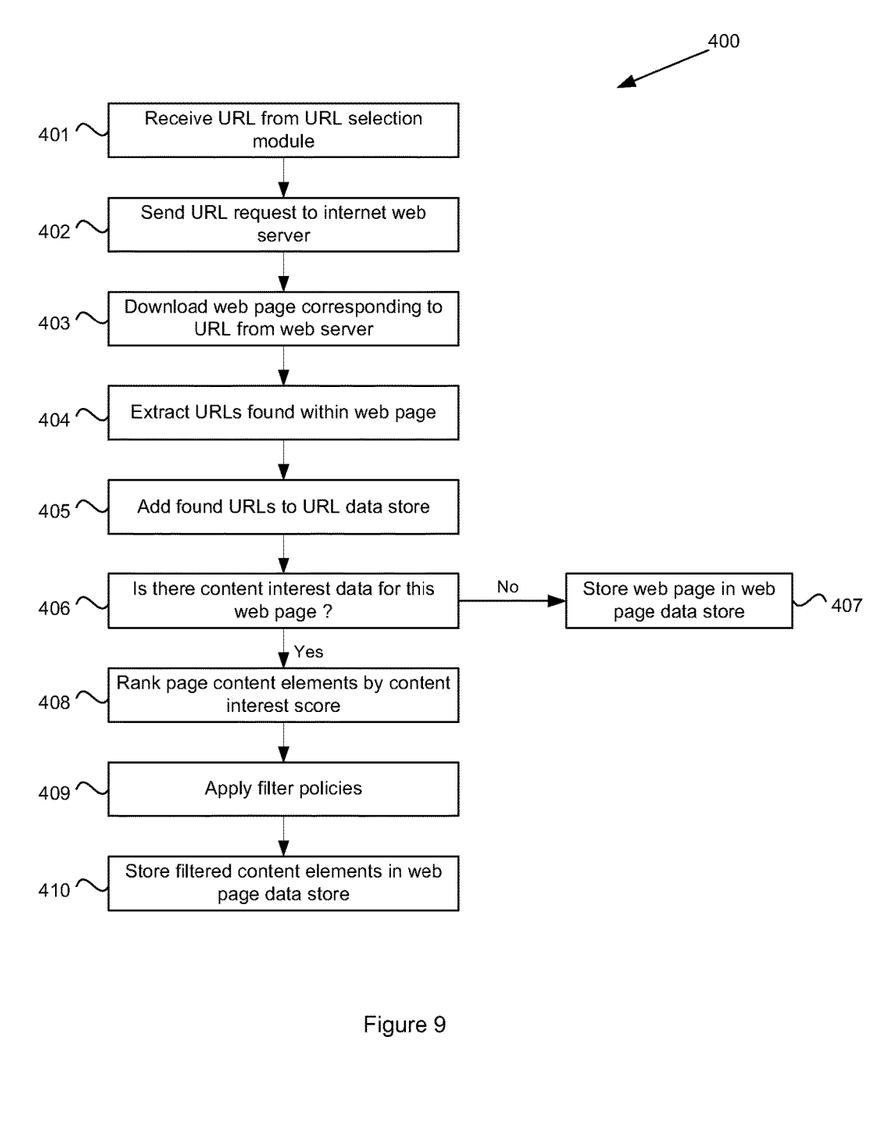
FIG. 9 illustrates an alternative method of the URL selection module.

An operation of the download module 214 is illustrated in the flowchart 400 of FIG. 9. Steps 401-405 are equivalent to steps 201-205 of the download module 14 described with reference to FIG. 3 above. Once the URLs found within a web page are added to the URL data store 16 at step 405, the content interest data store 217 may be queried (step 406) to determine if the web page being downloaded has content interest data. If no content interest data is available, the process proceeds as before by storing the web page content into the web page data store 15 (step 407). If content interest data is available, then the page elements may be ranked by their respective content interest score (step 408). At step 409, a filter policy may be applied to the content elements. For example, content elements may be filtered for the most interesting content or for content above a certain threshold content interest score. Alternatively, content elements, such as DOM elements, may be grouped by similar content interest scores for an indexer or search engine. After filtering, the content elements of the web page, or at least those elements that pass the filter, may be stored in the web page data store 15 (step 410).

In a further embodiment, the modified web crawler 212 of FIG. 8 may be used to apply alternative URL selection policies in the URL selection module 18. In one embodiment, the URL selection module may select only URLs having human out-clicks, where the source element, i.e. the content element where a user's attention was directed prior to the out-click event, is a content element with a high content interest score. This selection policy requires a data correlation between the last content element to have the focus of the user's attention and the link (URL) of a human out-click. Such a data correlation may be built from the event stream and attention analysis data.

An alternative URL selection policy may specify that URLs (or human out-click URLs) will only be followed if there is some form of human area of interest within the page where the URL was found, e.g. a content element with a high enough content interest score. A further alternative URL selection policy may specify that URLs (or human out-click URLs) will only be followed if they are found within a content element with high enough content interest.

The URL selection policies followed by the URL selection module focus the web crawlers resources towards those web pages that are actively used by humans and thus generate particular attention events. Using the selection policies may significantly increase the efficiency of the web crawler and assist in providing higher quality page ranking statistics. Furthermore, as described above, common human browsing patterns, can be recognized via attention analysis for link farm pages, parked pages where the most interesting content is advertisements, and auto-generated "spam" pages. Human outclicks on pages that have no content of interest other than ads can be ignored by the URL selection module.

The embodiments described herein provide an enhanced system and method for web crawling that avoids spending resources collecting web pages that are not useful to humans. The effect of these embodiments is to reduce or eliminate the advantages of a link farm and to remove search engine spam. At current internet growth rates, the requirement to crawl less of the internet can provide large resource savings as well as making page ranking of web pages more efficient and useful for humans. By focusing crawling to the web pages relevant to and used by humans, the ability of artificially manipulate search engine rankings is reduced.

Figure 10:
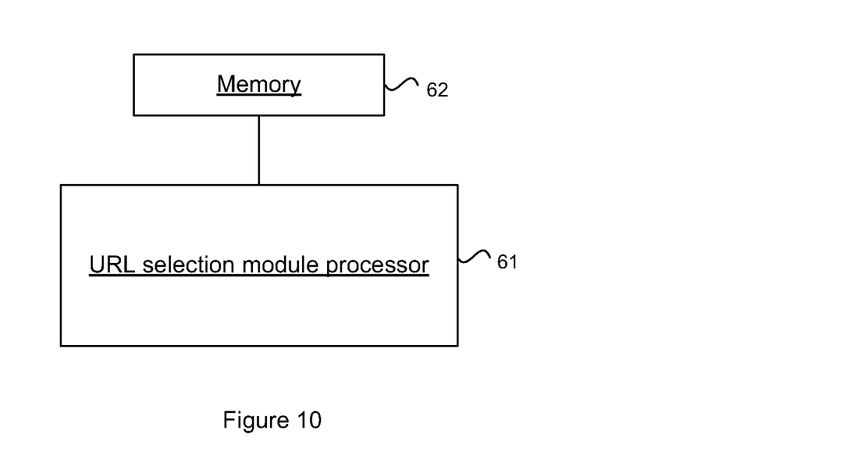
FIG. 10 illustrates a processor and memory of a URL selection module.
Figure 11:
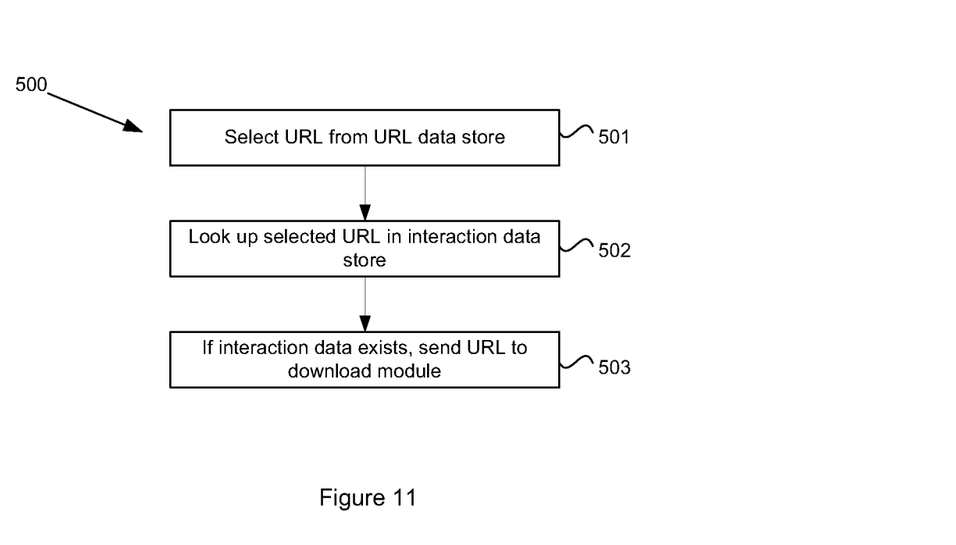
FIG. 11 illustrates an instruction set that may be executed on the processor and memory of FIG. 10.
Figure 12:
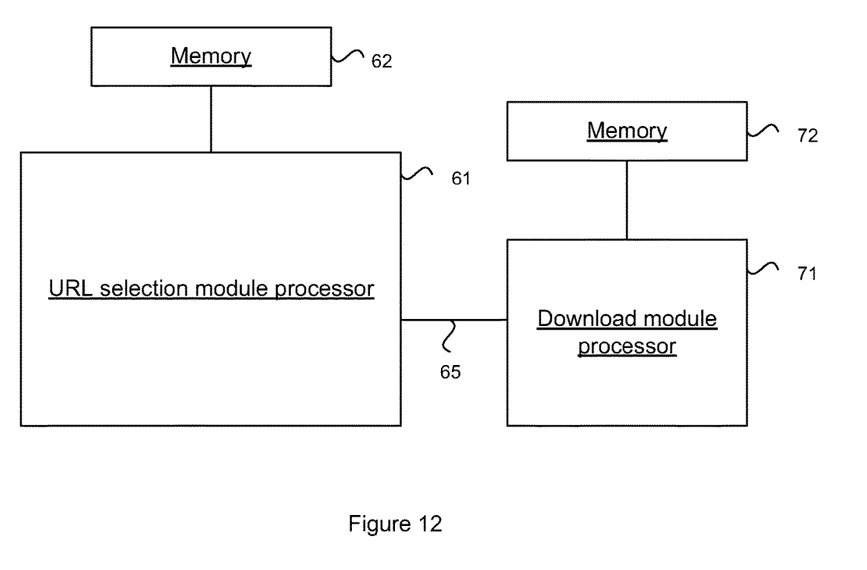
FIG. 12 illustrates the processor and memory of FIG. 10 in association with a processor and memory of an download module.

The web crawler 12 may be embodied in hardware, software, firmware or a combination of hardware, software and/or firmware. In a hardware embodiment, components of the web crawler 12 may be embodied in a device, such as server hardware, computer, etc. For example, the URL selection module 18 may include a processor 61 operatively associated with a memory 62 as shown in FIG. 10. The memory 62 may store instructions that are executable on the processor 61. In addition, the memory 62 may provide elements of the URL data store 16 and/or interaction data store 19. An instruction set 500 that may be executed on the URL selection module processor 61 is depicted in the flowchart of FIG. 11. Specifically, when executed, the instruction set 500 allows the processor to select (step 501) a URL from the URL data store and look up the URL in the interaction data store to determine if interaction data for the URL exists (step 502). If interaction data does exist, the processor 61 provides the selected URL to the download module. The download module may also be embodied in hardware and have a processor 71 and operatively associated memory 72 as shown in FIG. 12. The download module processor 71 may communicate with the URL selection module processor 61 by an appropriate communication link. If appropriate, aspects of the URL selection module may be performed by the download module. For example, the download module may perform ranking of the URLs to be downloaded or may choose to ignore URLs provided by the URL selection module if content interest data for a URL is unavailable or indicates an insufficient content interest score.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of selecting a uniform resource locator (URL) in a web crawling procedure, the method comprising:
   querying a URL data store for URLs corresponding to webpages which have not been previously downloaded by a web crawler computing device during a web crawling procedure;
   retrieving from the URL data store, in response to the querying, a plurality of URLs corresponding to webpages which have not been previously downloaded by the web crawler computing device during the web crawling procedure;
   for each particular URL in the plurality of retrieved URLs:
   (a) identifying one or more additional URLs within the URL data store corresponding to webpages that have been downloaded during the web crawling procedure, and that contain links to the particular URL; and
   (b) retrieving, from interaction data store, user interaction event data associated with the identified one or more additional URLs that include links to the particular URL;
   selecting a highest ranked URL from the plurality of retrieved URLs, based on the user interaction event data retrieved from the interaction data store associated with the plurality of retrieved URLs, wherein the selection of a particular URL as the highest ranked URL comprises performing a source element ranking and attention shift analysis for one or more web pages that include links to the particular URL, wherein performing the source element ranking and attention shift analysis comprises:
   (a) detecting user interactions with content areas of each of the one or more web pages that include links to the particular URL, wherein the user interactions detected comprise one or more of clicks, hints, or lingers on the on the content areas of the web pages; and
   (b) determining, based on the detected user interactions with the content areas, that the one or more web pages that include links to the particular URL are valid web pages;
   submitting the selected URL to a download module;
   downloading, by the download module, a webpage corresponding to the selected URL;
   processing the downloaded webpage to extract any URLs within the downloaded webpage; and
   adding the extracted URLs to the URL data store.

2. The method of claim 1, wherein the selection of the highest ranked URL is based on retrieving at least one predetermined human interaction behavior.

3. The method of claim 2, wherein the at least one predetermined human interaction behavior comprises a content of interest ranking within the web pages that include links to the URL.

4. The method of claim 1, wherein selecting the highest ranked URL comprises:
   ranking the plurality of URLs based on at least one user behavior action out-click of web pages that include links to the URL.

5. The method of claim 1, wherein selecting the highest ranked URL comprises:
ranking the plurality of URLs based on a location of the URL within known human attentive areas of a web page that includes a link to the URL.

6. The method of claim 1, further comprising:
querying a content interest data store to determine whether the downloaded web page comprises content interest data.

7. The method of claim 6, further comprising:
ranking one or more page elements of the downloaded web page according to their respective content interest score, in response to determining that the downloaded includes content interest data.

8. An apparatus configured to select a uniform resource locator (URL) in a web crawling procedure, the apparatus comprising:
one or more processors; and
memory storing computer-readable instructions that, when executed by the one or more processors, cause the apparatus to:
query a URL data store for URLs corresponding to webpages which have not been previously downloaded device during a web crawling procedure;
retrieve from the URL data store, in response to the querying, a plurality of URLs corresponding to webpages which have not been previously downloaded during the web crawling procedure;
for each particular URL in the plurality of retrieved URLs:
(a) identify one or more additional URLs within the URL data store corresponding to webpages that have been downloaded during the web crawling procedure, and that contain links to the particular URL; and
(b) retrieve, from interaction data store, user interaction event data associated with the identified one or more additional URLs that include links to the particular URL;
select a highest ranked URL from the plurality of retrieved URLs based on the user interaction event data retrieved from the interaction data store associated with the plurality of retrieved URLs, wherein the selection of a particular URL as the highest ranked URL comprises performing a source element ranking and attention shift analysis for one or more web pages that include links to the particular URL, wherein performing the source element ranking and attention shift analysis comprises:
(a) detecting user interactions with content areas of each of the one or more web pages that include links to the particular URL, wherein the user interactions detected comprise one or more of clicks, hints, or lingers on the on the content areas of the web pages; and
(b) determining, based on the detected user interactions with the content areas, that the one or more web pages that include links to the particular URL are valid web pages;
submit the selected URL to a download module;
receive the selected URL;
download a webpage corresponding to the selected URL;
process the downloaded webpage to extract identify URLs within the downloaded webpage; and
add the extracted URLs to the URL data store.

9. The apparatus of claim 8, wherein the selection of the highest ranked URL is based on retrieving at least one predetermined human interaction behavior.

10. The apparatus of claim 9, wherein the at least one predetermined human interaction behavior comprises a content of interest ranking within the web pages that include links to the URL.

11. The apparatus of claim 8, wherein selecting the highest ranked URL comprises:
ranking the plurality of URLs based on at least one user behavior action out-click of web pages that include links to the URL.

12. The apparatus of claim 8, wherein selecting the highest ranked URL comprises:
ranking the plurality of URLs based on a location of the URL within known human attentive areas of a web page that includes a link to the URL.

13. The apparatus of claim 8, the memory storing further computer-readable instructions that when executed by the one or more processors, cause the apparatus to:
query a content interest data store to determine whether the downloaded web page comprises content interest data.

14. The apparatus of claim 13, the memory storing further computer-readable instructions that when executed by the one or more processors, cause the apparatus to:
rank one or more page elements of the downloaded web page according to their respective content interest score, in response to determining that the downloaded includes content interest data.

15. A non-transitory computer readable storage medium configured to store instructions that when executed cause a processor to perform selecting a uniform resource locator (URL) in a web crawling procedure, the processor being further configured to perform:
querying a URL data store for URLs corresponding to webpages which have not been previously downloaded by a web crawler computing device during a web crawling procedure;
retrieving from the URL data store, in response to the querying, a plurality of URLs corresponding to webpages which have not been previously downloaded by the web crawler computing device during the web crawling procedure; for each particular URL in the plurality of retrieved URLs:
(a) identifying one or more additional URLs within the URL data store corresponding to webpages that have been downloaded during the web crawling procedure, and that contain links to the particular URL; and
(b) retrieving, from interaction data store, user interaction event data associated with the identified one or more additional URLs that include links to the particular URL;
selecting a highest ranked URL from the plurality of retrieved URLs based on the user interaction event data records retrieved from the interaction data store associated with the plurality of retrieved URLs, wherein the selection of a particular URL as the highest ranked URL comprises performing a source element ranking and attention shift analysis for one or more web pages that include links to the particular URL, wherein performing the source element ranking and attention shift analysis comprises:
(a) detecting user interactions with content areas of each of the one or more web pages that include links to the particular URL, wherein the user interactions detected comprise one or more of clicks, hints, or lingers on the on the content areas of the web pages; and (b) determining, based on the detected user interactions with the content areas, that the one or more web pages that include links to the particular URL are valid web pages;

submitting the selected URL to a download module;

downloading, by the download module, a webpage corresponding to the selected URL;

processing the downloaded webpage to extract any URLs within the downloaded webpage; and adding the extracted URLs to the URL data store.

16. The non-transitory computer readable storage medium of claim 15, wherein the selection of the highest ranked URL is based on retrieving at least one predetermined human interaction behavior.

17. The non-transitory computer readable storage medium of claim 16, wherein the at least one predetermined human interaction behavior comprises a content of interest ranking within the web pages that include links to the URL.

18. The non-transitory computer readable storage medium of claim 15, wherein selecting the highest ranked URL comprises:

ranking the plurality of URLs based on at least one user behavior action out-click of web pages that include links to the URL.

19. The non-transitory computer readable storage medium of claim 15, wherein selecting the highest ranked URL comprises:

ranking the plurality of URLs based on a location of the URL within known human attentive areas of a web page that includes a link to the URL.

20. The non-transitory computer readable storage medium of claim 15, wherein the processor is further configured to perform:

querying a content interest data store to determine whether the downloaded web page comprises content interest data.

* * * * *

UNITED STATES PATENT AND TRADEMARK OFFICE
CERTIFICATE OF CORRECTION

PATENT NO. : 9,940,391 B2
APPLICATION NO. : 13/287535
DATED : April 10, 2018
INVENTOR(S) : Hauser Page 1 of 1

It is certified that error appears in the above-identified patent and that said Letters Patent is hereby corrected as shown below:

In Column 8, Line 44, in Claim 1, delete "on the on the" and insert -- on the --, therefor.

In Column 9, Line 56, in Claim 8, delete "on the on the" and insert -- on the --, therefor.

In Column 11, Line 2, in Claim 15, delete "on the on the" and insert -- on the --, therefor.

Signed and Sealed this
Second Day of October, 2018

Andrei Iancu
*Director of the United States Patent and Trademark Office*